(12) United States Patent
Achiwa

(10) Patent No.: US 10,089,561 B2
(45) Date of Patent: Oct. 2, 2018

(54) GENERATING A RASTER IMAGE REGION BY RENDERING IN PARALLEL PLURAL REGIONS OF SMALLER HEIGHT AND SEGMENTING THE GENERATED RASTER IMAGE REGION INTO PLURAL REGIONS OF SMALLER WIDTH

(71) Applicant: CANON KABUSHIKI KAISHA, Tokyo (JP)

(72) Inventor: Ken Achiwa, Kashiwa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/515,095

(22) PCT Filed: Sep. 16, 2015

(86) PCT No.: PCT/JP2015/004728
§ 371 (c)(1),
(2) Date: Mar. 28, 2017

(87) PCT Pub. No.: WO2016/051703
PCT Pub. Date: Apr. 7, 2016

(65) Prior Publication Data
US 2017/0206628 A1     Jul. 20, 2017

(30) Foreign Application Priority Data

Sep. 29, 2014   (JP) ................................. 2014-199178

(51) Int. Cl.
*G06K 15/02*           (2006.01)
(52) U.S. Cl.
CPC ......... *G06K 15/1857* (2013.01); *G06K 15/02* (2013.01); *G06K 15/1863* (2013.01)

(58) Field of Classification Search
CPC .......... G06K 15/1836; G06K 15/1857; G06K 15/1861; G06K 15/1863; G06K 3/124
See application file for complete search history.

(56) References Cited

U.S. PATENT DOCUMENTS 5,594,860 A * 1/1997 Gauthier ................ G06K 15/00
                                                          345/502
5,619,624 A * 4/1997 Schoenzeit ............. G06T 11/00
                                                          345/418
(Continued)

FOREIGN PATENT DOCUMENTS

CN          102194211 A      9/2011
JP       2004-072683 A       3/2004
(Continued)

*Primary Examiner* — Scott A Rogers
(74) *Attorney, Agent, or Firm* — Canon U.S.A., Inc. IP Division

(57) ABSTRACT

An image processing apparatus which segments a raster image of a region having a predetermined width and a predetermined height includes an acquiring unit configured to acquire print data, a plurality of rendering units each configured to perform rendering in regions each having the predetermined width and a height smaller than the predetermined height based on the print data to generate a raster image of a region having the predetermined width and the predetermined height, the rendering being performed in parallel by the plurality of rendering units, and a segmenting unit configured to segment the generated raster image of the region having the predetermined width and the predetermined height into raster images of a plurality of segment regions each having a width smaller than the predetermined width and the predetermined height.

15 Claims, 15 Drawing Sheets

(56) References Cited

U.S. PATENT DOCUMENTS

| | | | |
|---|---|---|---|
| 8,269,996 B2* | 9/2012 | Yamamoto | H04N 1/0473 347/224 |
| 8,446,605 B2* | 5/2013 | Takahashi | G06K 15/1859 358/1.1 |
| 9,600,747 B2* | 3/2017 | Achiwa | G06K 15/1857 |
| 9,672,450 B2* | 6/2017 | Hashii | G06K 15/1857 |
| 2011/0235911 A1 | 9/2011 | Kuroki | |
| 2014/0071463 A1 | 3/2014 | Achiwa | |
| 2017/0270393 A1* | 9/2017 | Suzuki | G06K 15/1813 |
| 2018/0082160 A1* | 3/2018 | Nakane | G06K 15/1813 |
| 2018/0101754 A1* | 4/2018 | Achiwa | G06K 15/184 |

FOREIGN PATENT DOCUMENTS

| | | |
|---|---|---|
| JP | 2013-119242 A | 6/2013 |
| JP | 2014-053822 A | 3/2014 |

\* cited by examiner

[Fig. 1]
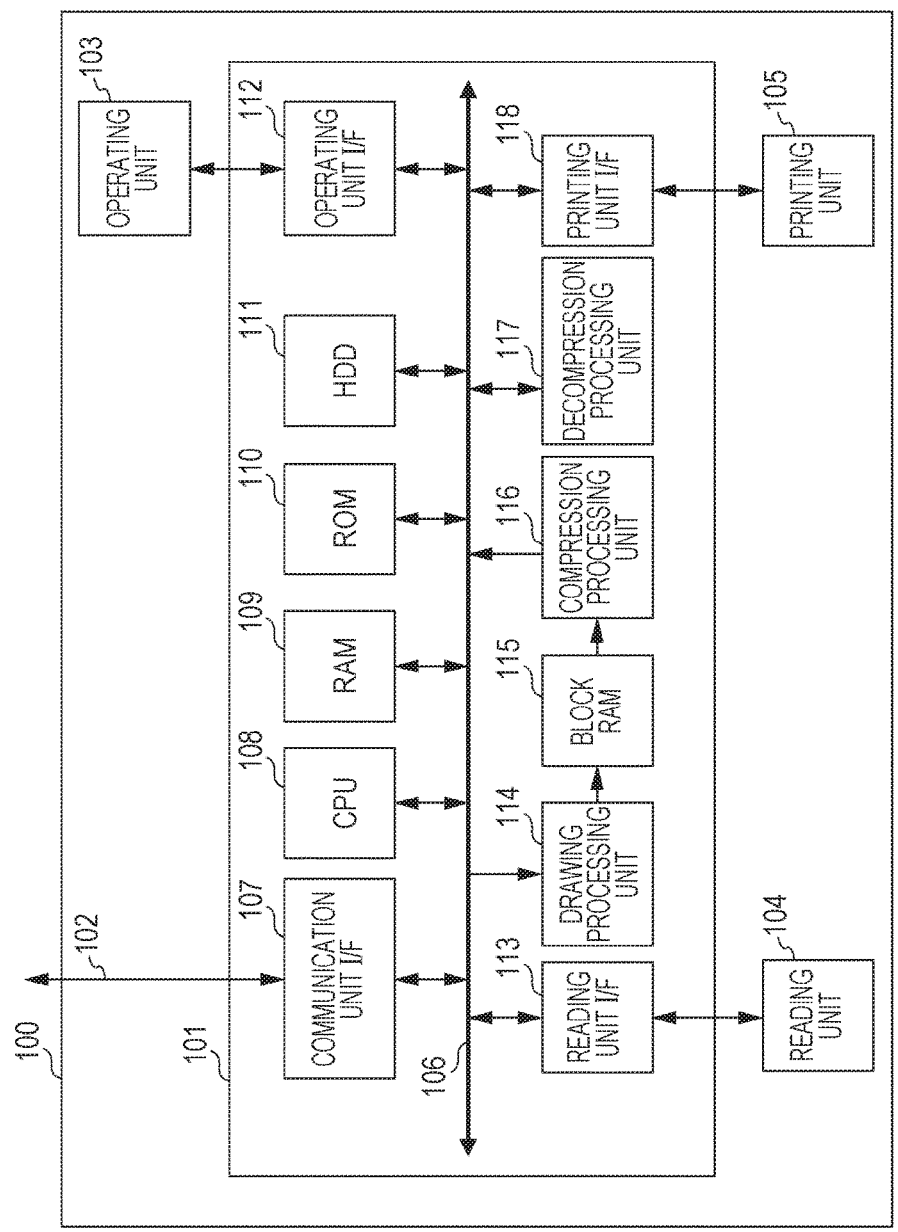

[Fig. 2]
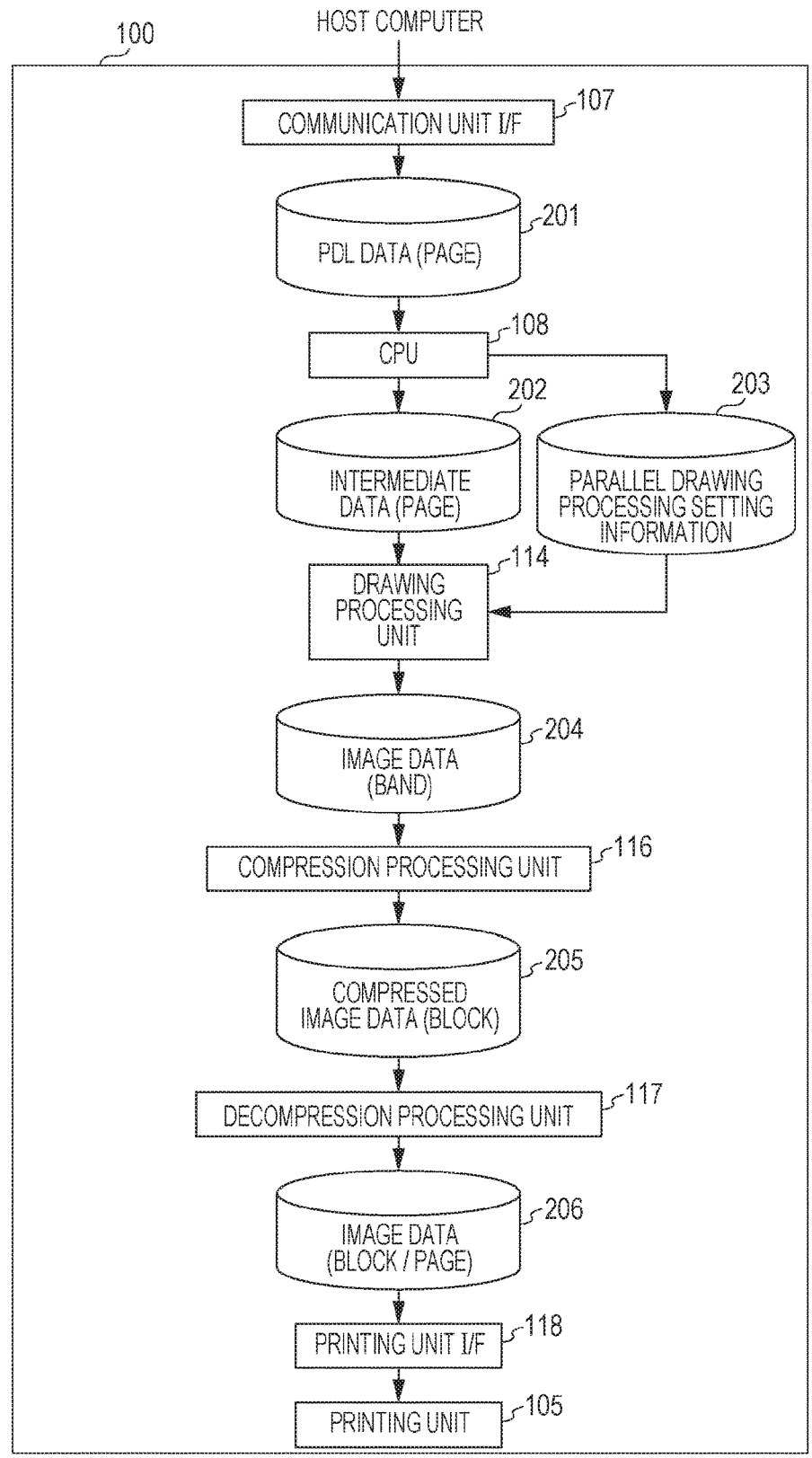

[Fig. 3A]
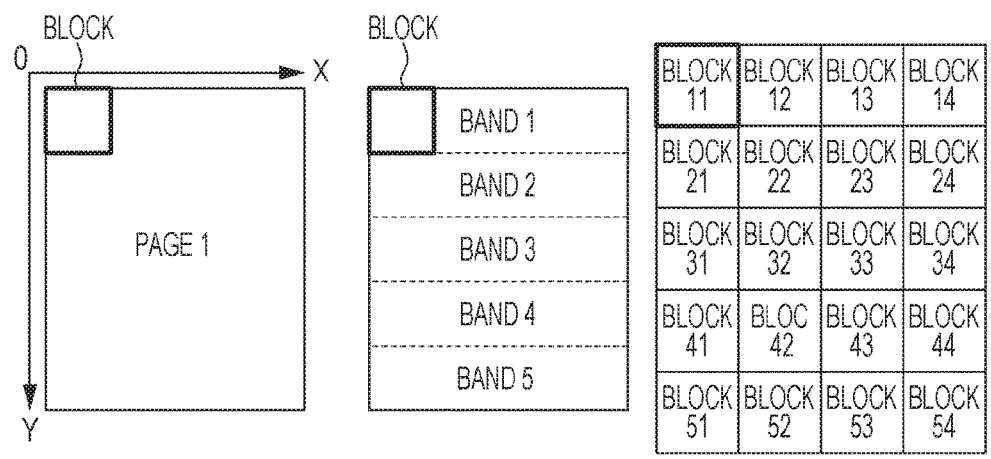
[Fig. 3B]
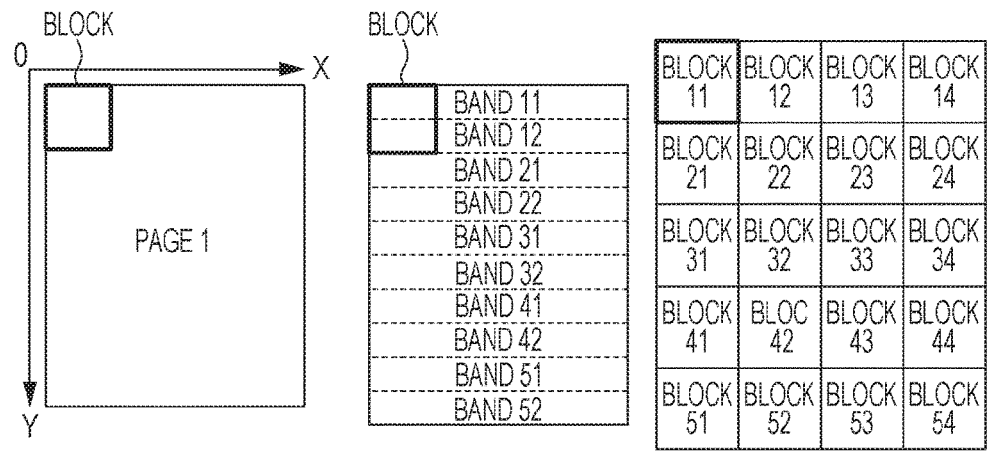

[Fig. 4A]
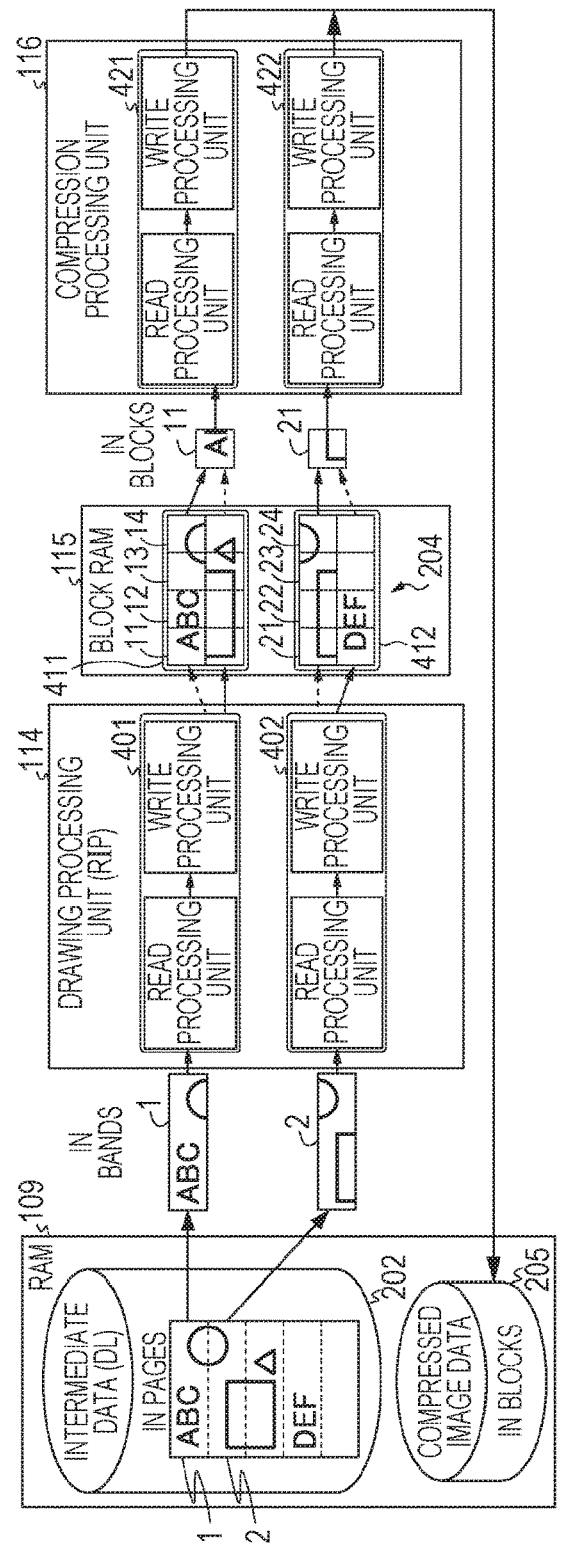

[Fig. 4B]
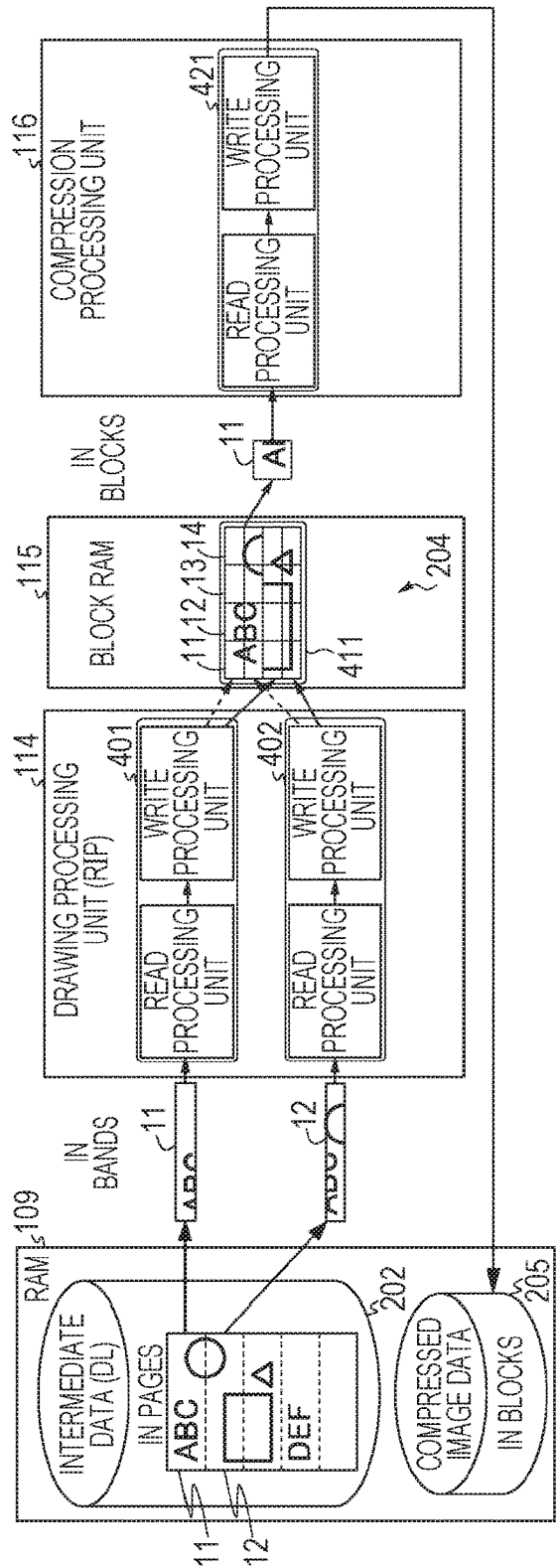

[Fig. 5]
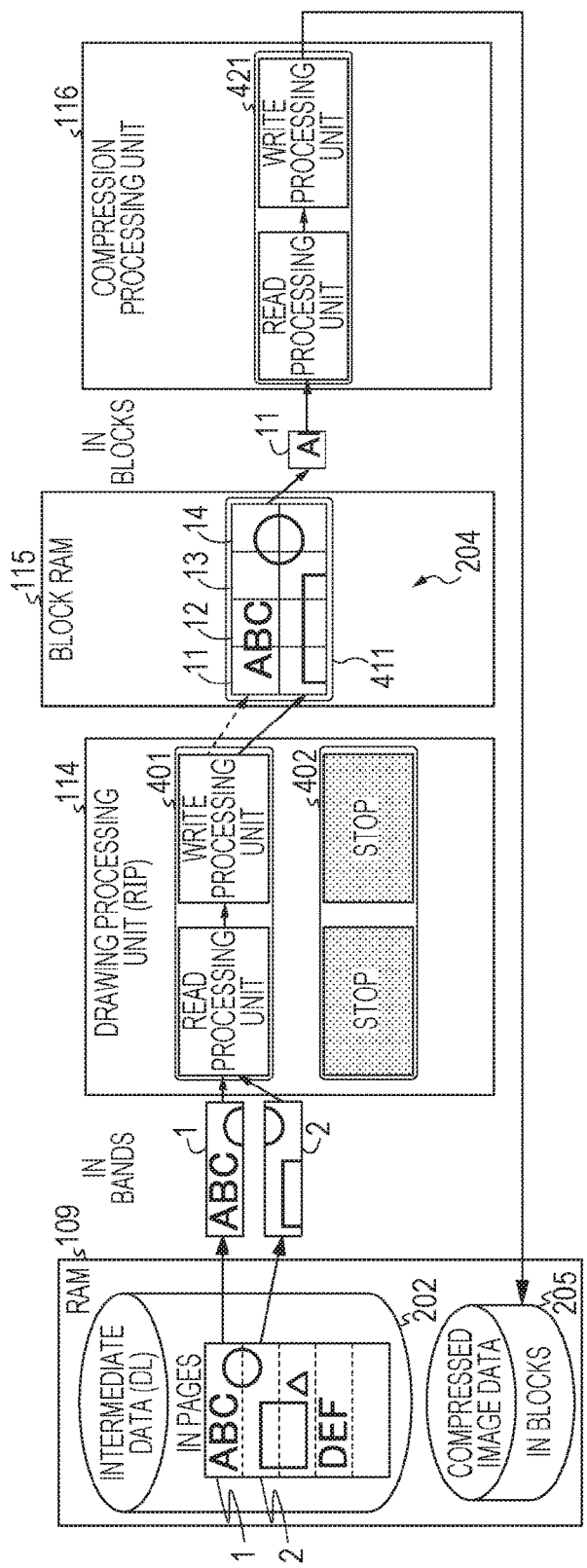

[Fig. 6]
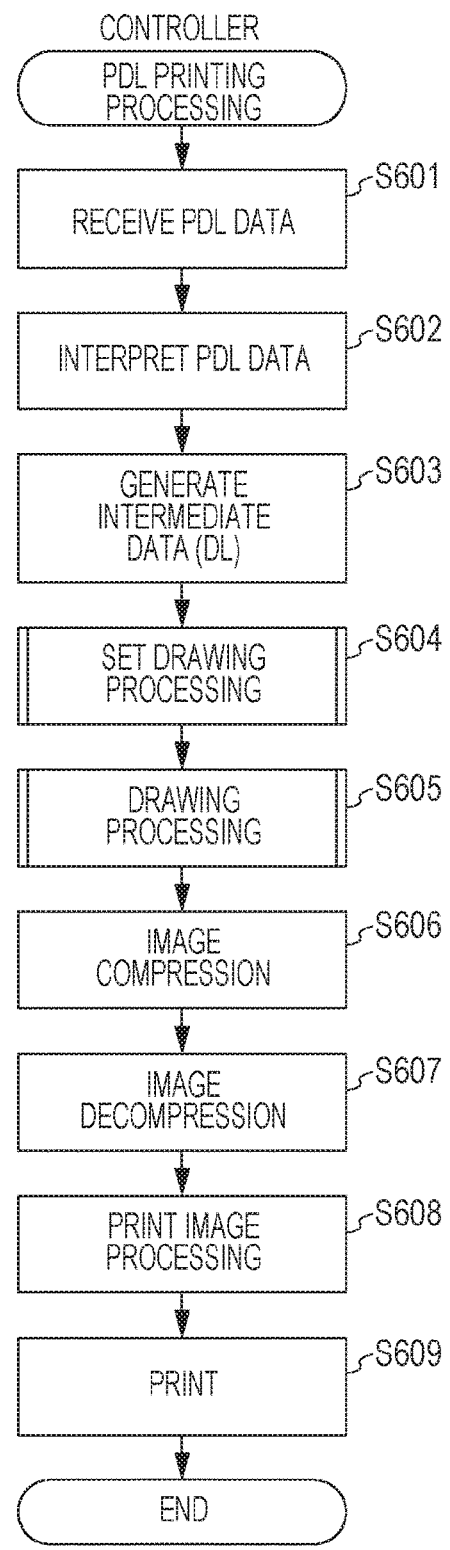

[Fig. 7]
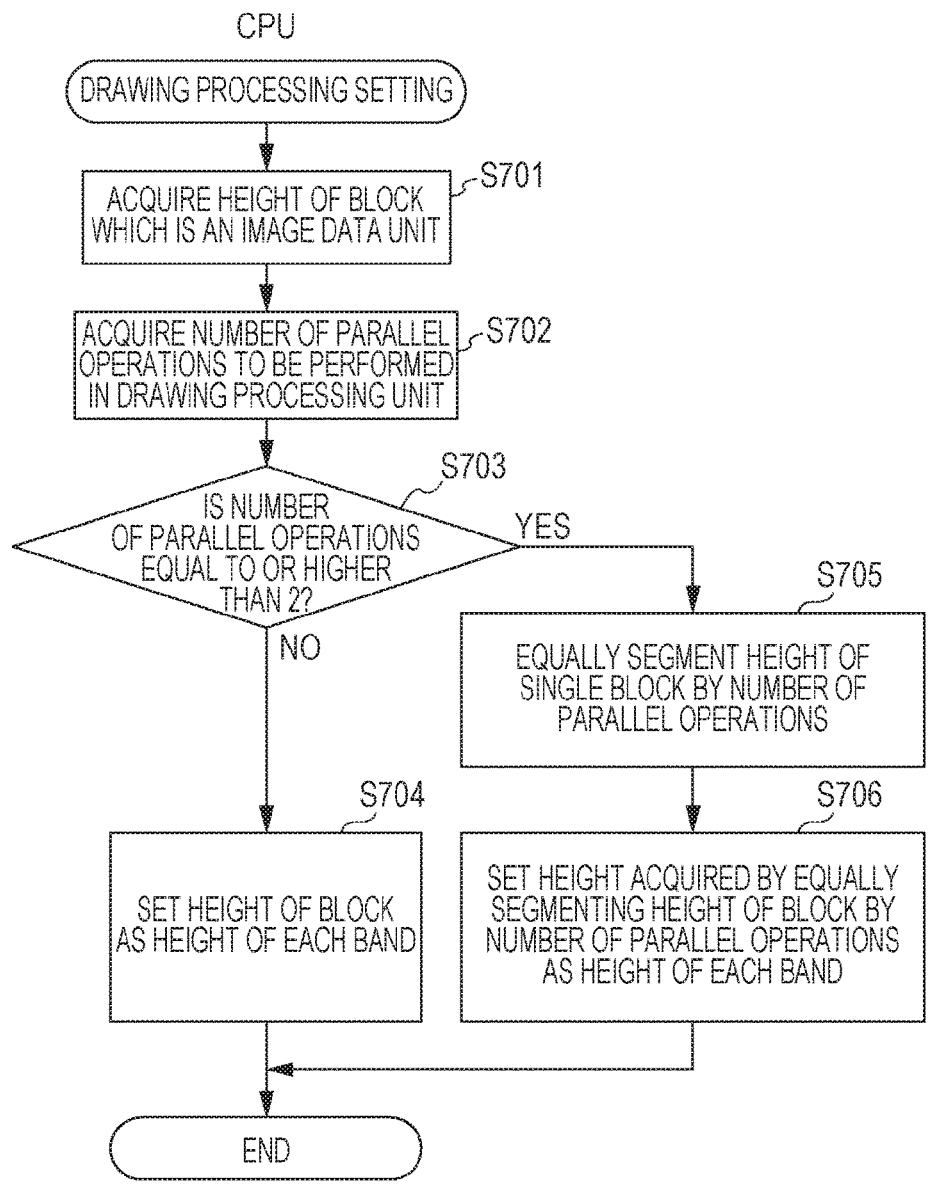

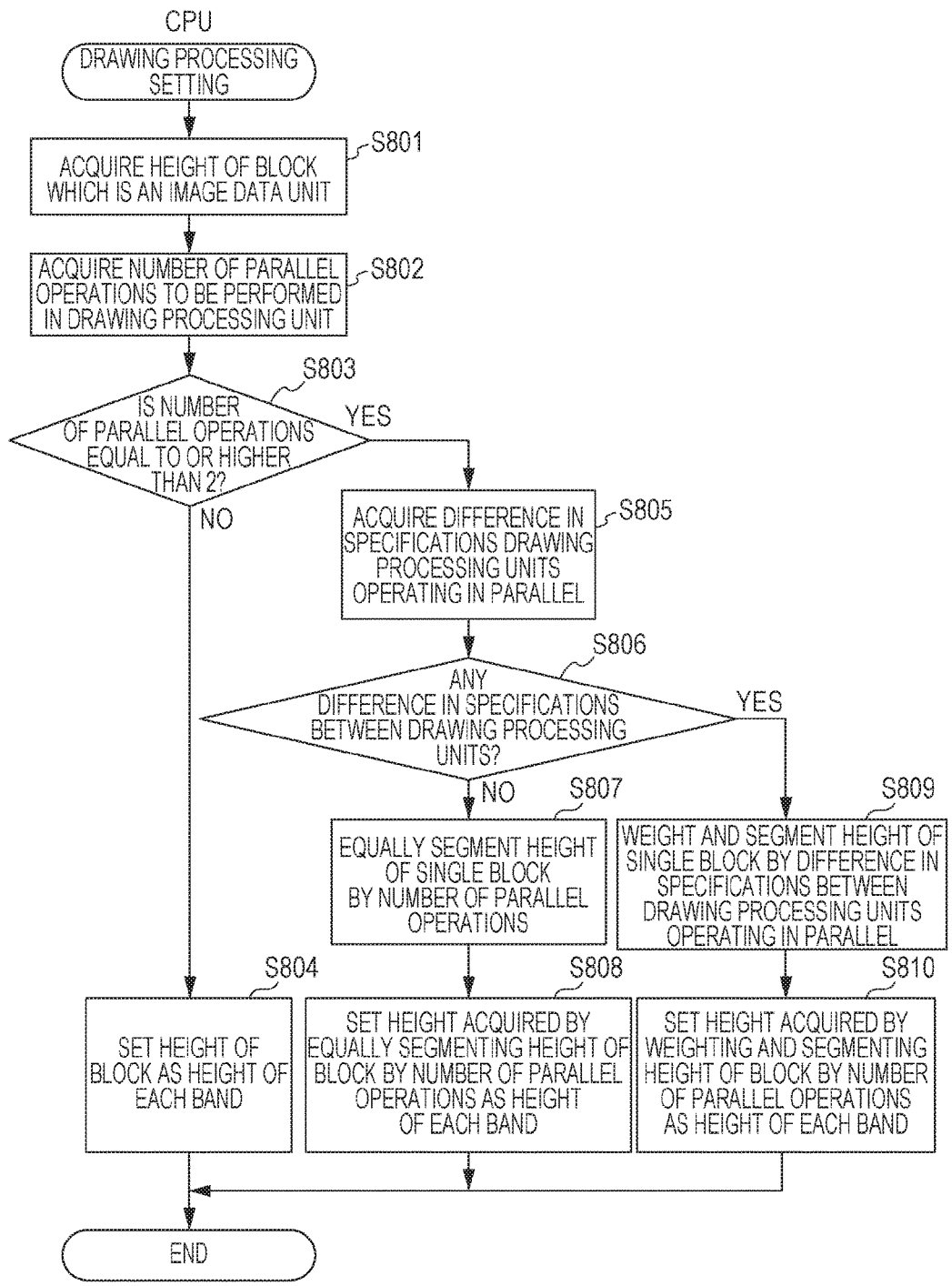
[Fig. 8]

[Fig. 9]
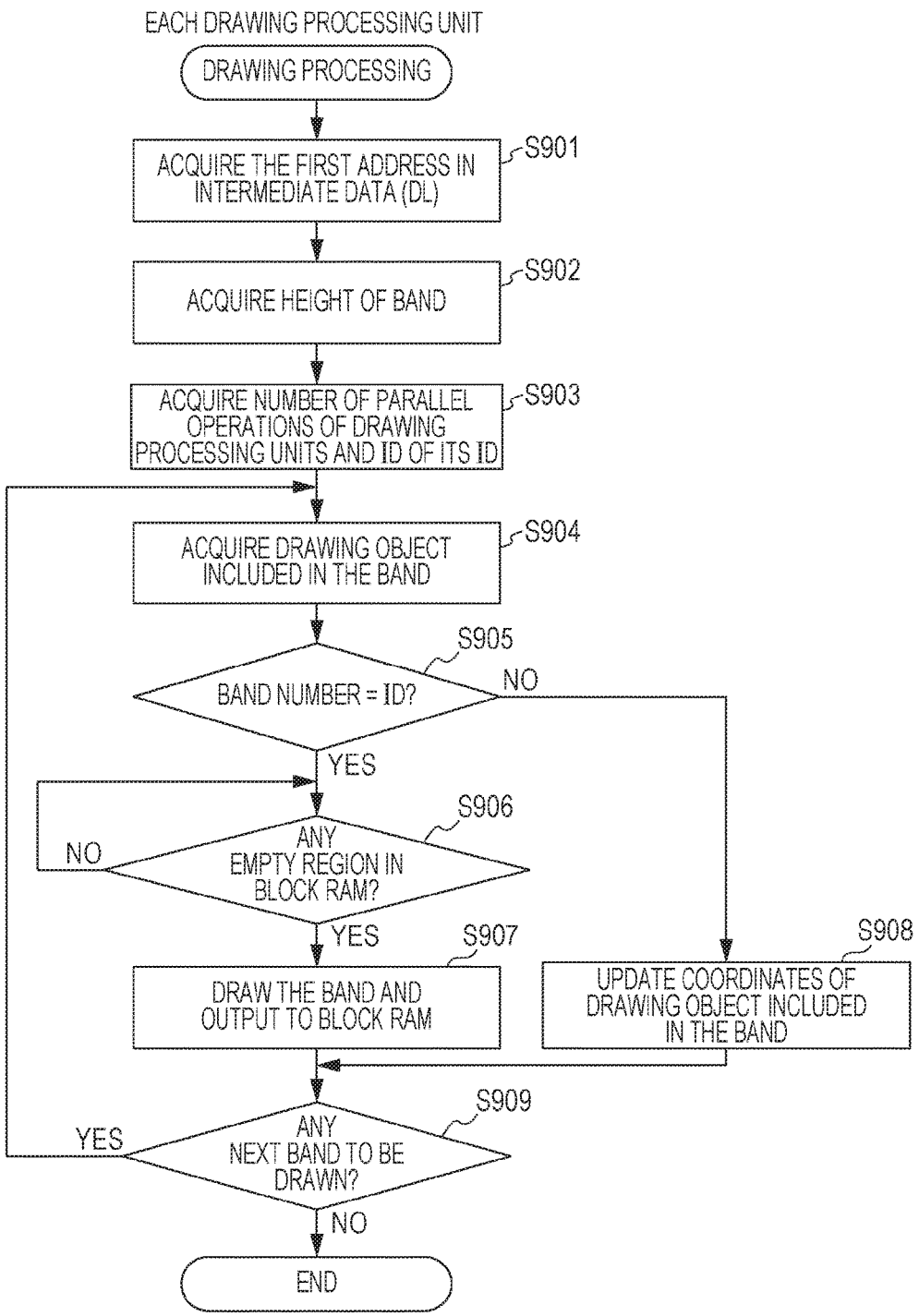

[Fig. 10A]
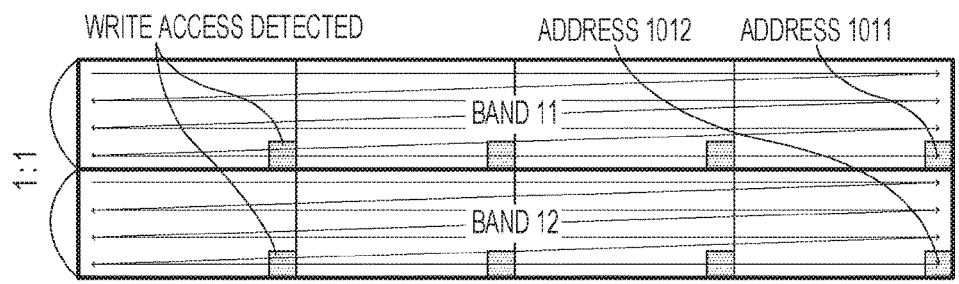
[Fig. 10B]
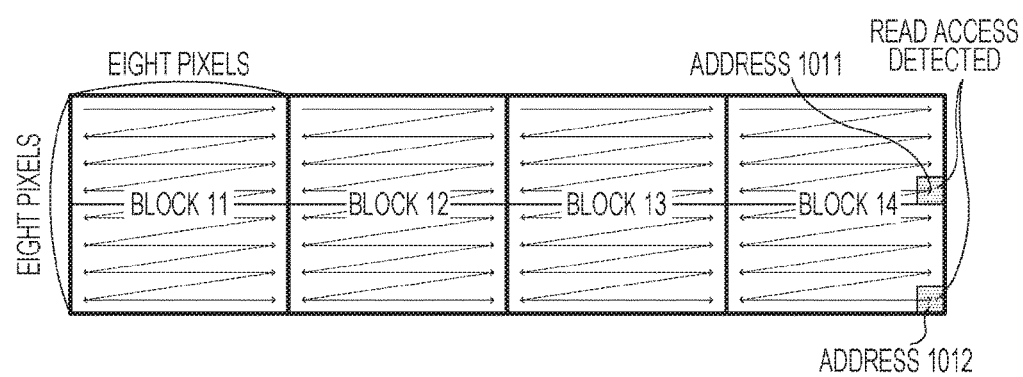
[Fig. 10C]
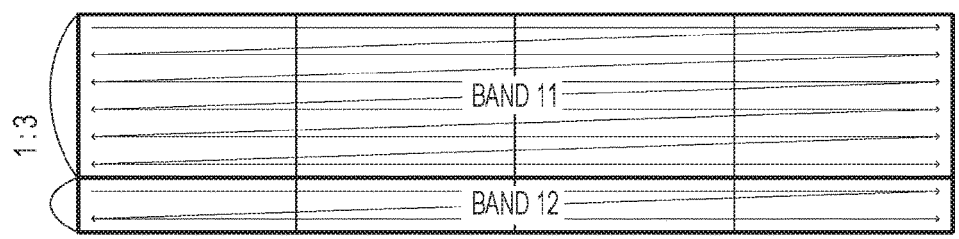

[Fig. 10D]
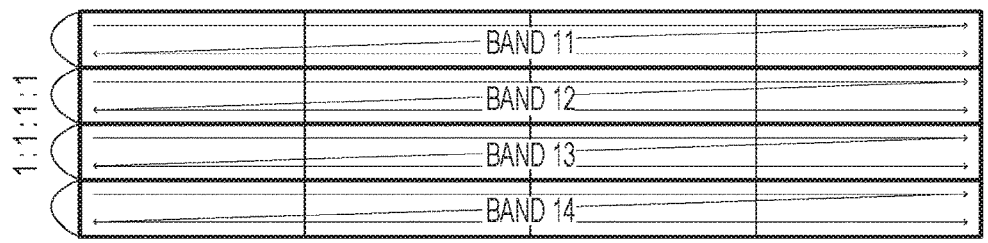
[Fig. 10E]
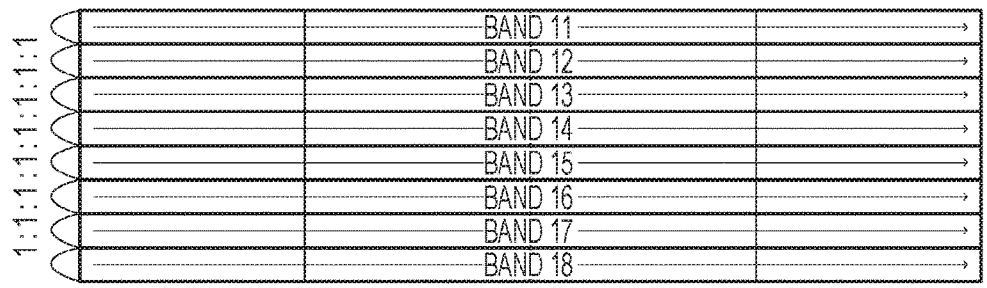
[Fig. 11A]
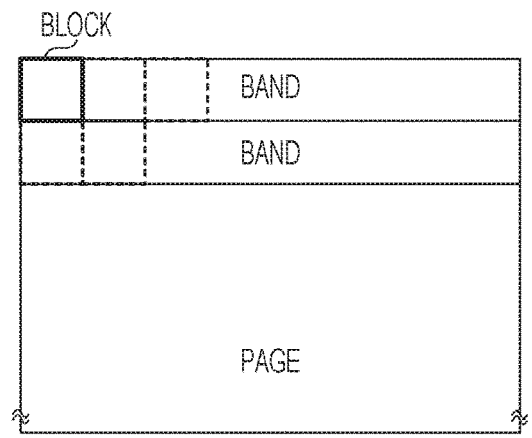

[Fig. 11B]
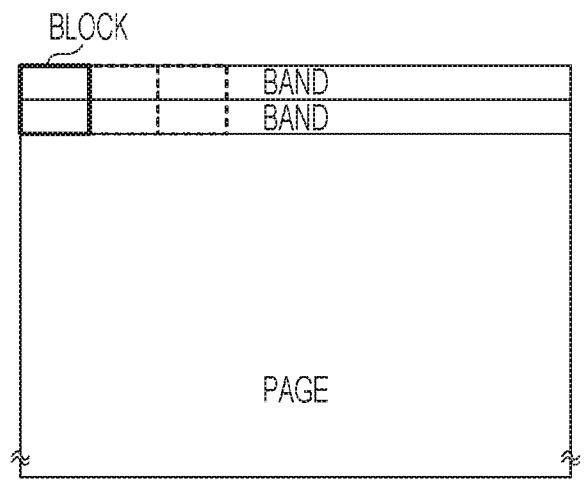
[Fig. 11C]
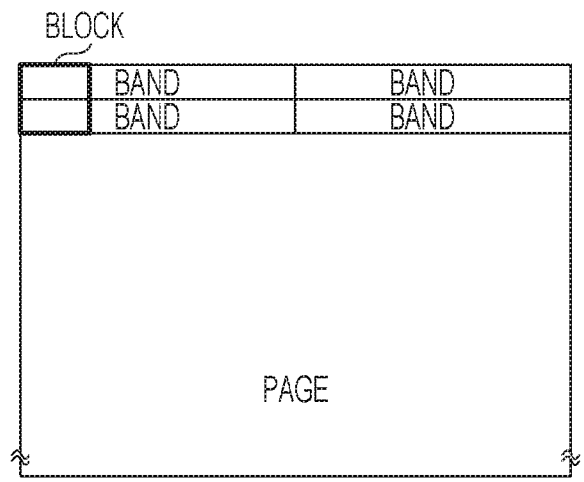

[Fig. 11D]
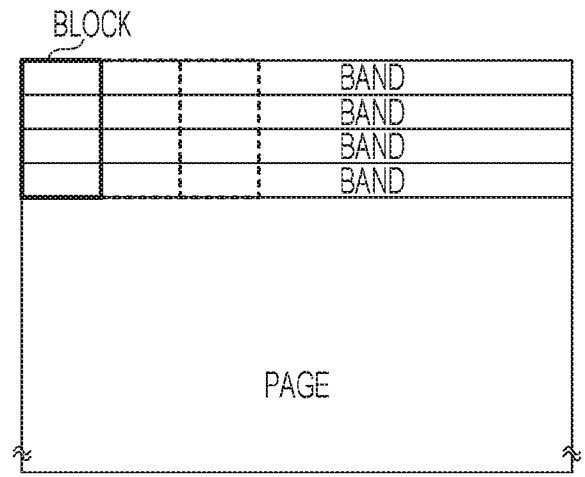
[Fig. 11E]
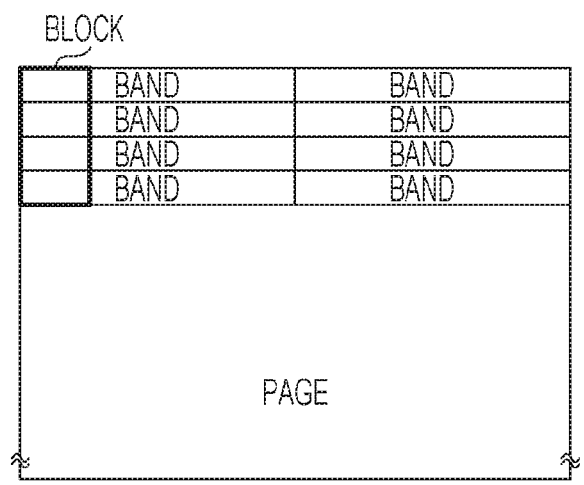

[Fig. 12A]

⤴ THE FIRST ADDRESS OF INTERMEDIATE DATA (DL)

```
DRAWING OBJECT 1 (STRING ABC, POINT p1, COLOR c1, x1, y1, w1, h1)
DRAWING OBJECT 2 (CIRCLE, RADIUS r2, COLOR c2, x2, y2, w2, h2)
DRAWING OBJECT 3 (SQUARE, WIDTH w3, HEIGHT h3, COLOR c3, x3, y3, w3, h3)
DRAWING OBJECT 4 (TRIANGLE, LEFT SLOPE ls4, RIGHT SLOPE rs4, HEIGHT h4, COLOR c4, x4, y4)
DRAWING OBJECT 5 (STRING DEF, POINT p5, COLOR c5, x5, y5)
END OF PAGE
```

[Fig. 12B]

SECOND DRAWING PROCESSING UNIT 402
ACQUIRES X-COORDINATE OF CONTOUR OF DRAWING OBJECT 4
FOR EACH SCAN LINE FOR DRAWING OBJECT 4
INCLUDED IN BAND 31 WHICH IS NOT TO BE DRAWN.

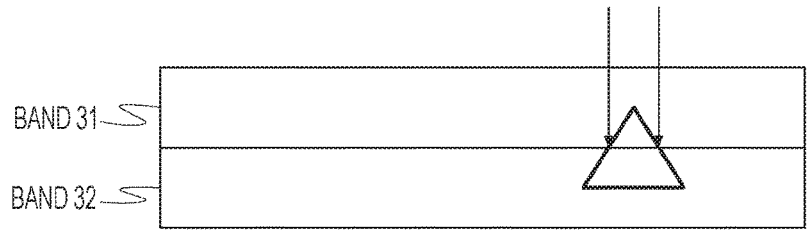

BAND 31
BAND 32

GENERATING A RASTER IMAGE REGION BY RENDERING IN PARALLEL PLURAL REGIONS OF SMALLER HEIGHT AND SEGMENTING THE GENERATED RASTER IMAGE REGION INTO PLURAL REGIONS OF SMALLER WIDTH

TECHNICAL FIELD

The present invention relates to a technology which allows rendering processes to be executed in a plurality of rendering processing units in parallel.

BACKGROUND ART

Raster data such as bitmap data may have been conventionally segmented into raster data pieces each having a rectangular shape (of 32 pixels×32 pixels, for example) suitable for image processing such as rotation processing. The rectangular shape (tile) raster data piece is also called tile data.

PTL 1 discloses the following processing. (1) A renderer generates raster data of a band having a height equal to the height (such as 32 pixels) of a tile from image data (print data) of a single page described in page description language (PDL); and (2) A tile segmenting unit segments the generated band raster data to tile data pieces suitable for image processing such as rotation processing. In other words, this technology segments raster data of a band having a height equal to the height of tiles generated by one renderer is segmented into a plurality of tile data pieces by one tile segmenting unit.

PTL 1, however, does not consider use of a plurality of renderers for higher speed of the raster data generation processing (rendering processing).

Parallel generation of raster data pieces of bands each having a height higher than a tile height by a plurality of renderers may require a memory for storing the generated raster data pieces of a plurality of bands until the tile segmentation ends. In other words, raster data of one band having a height equal to a tile height to be segmented into a plurality of tile data pieces contain raster data generated by one renderer but do not contain raster data generated by another renderer.

CITATION LIST

Patent Literature

PTL 1: Japanese Patent Laid-Open No. 2014-53822

SUMMARY OF INVENTION

The present invention provides an image processing apparatus which segments a raster image of a region having a predetermined width and a predetermined height, the apparatus including an acquiring unit configured to acquire print data, a plurality of rendering units each configured to perform rendering in regions each having the predetermined width and a height smaller than the predetermined height based on the print data to generate a raster image of a region having the predetermined width and the predetermined height, the rendering being performed in parallel by the plurality of rendering units, and a segmenting unit configured to segment the generated raster image of the region having the predetermined width and the predetermined height into raster images of a plurality of segment regions each having a width smaller than the predetermined width and the predetermined height.

Further features of the present invention will become apparent from the following description of exemplary embodiments with reference to the attached drawings.

BRIEF DESCRIPTION OF DRAWINGS

FIG. 1 illustrates a configuration of an image formation apparatus.

FIG. 2 illustrates a dataflow for PDL printing processing in the image formation apparatus.

FIG. 3A illustrates an example of a coordinate system of a rectangular region within a page to be handled by the image formation apparatus.

FIG. 3B illustrates another example of a coordinate system of a rectangular region within a page to be handled by the image formation apparatus.

FIG. 4A illustrates a configuration associated with rendering processing.

FIG. 4B illustrates a configuration associated with rendering processing.

FIG. 5 illustrates a state that partial components associated with rendering processing terminate.

FIG. 6 is a flowchart illustrating PDL printing processing.

FIG. 7 is a flowchart illustrating a setting for a rendering process according to an exemplary embodiment.

FIG. 8 is a flowchart illustrating a setting for a rendering process according to an exemplary embodiment.

FIG. 9 is a flowchart illustrating a parallel rendering process.

FIG. 10A illustrates access control over writing in bands and reading in blocks.

FIG. 10B illustrates access control over writing in bands and reading in blocks.

FIG. 10C illustrates access control over writing in bands and reading in blocks.

FIG. 10D illustrates access control over writing in bands and reading in blocks.

FIG. 10E illustrates access control over writing in bands and reading in blocks.

FIG. 11A illustrates a positional relationship between rectangular regions in bands and in blocks in the rectangular regions.

FIG. 11B illustrates a positional relationship between rectangular regions in bands and in blocks in the rectangular regions.

FIG. 11C illustrates a positional relationship between rectangular regions hands and in blocks in the rectangular regions.

FIG. 11D illustrates a positional relationship between rectangular regions in bands and in blocks in the rectangular regions.

FIG. 11E illustrates a positional relationship between rectangular regions in bands and in blocks in the rectangular regions.

FIG. 12A illustrates update of coordinates of a rendering object included in a display list.

FIG. 12B illustrates update of coordinates of a rendering object included in a display list.

DESCRIPTION OF EMBODIMENTS

Embodiments of the present invention will be described below with reference to drawings.

FIG. 1 illustrates a configuration example of an image formation apparatus according to an exemplary embodiment of the present invention. As illustrated in FIG. 1, an image formation apparatus 100 includes a controller 101, a network 102, an operating unit 103, a reading unit 104, and a printing unit 105. The network 102 is a communication unit which may be implemented by a LAN or a WAN (public network), for example, and may exchange image data and device information with an external apparatus such as a host computer and a server and the image formation apparatus 100. The operating unit 103 is a processing unit configured to acquire a user operation as control information for image processing and display control information for image processing to a user. The reading unit (scanner engine) 104 is an image input device which is a processing unit configured to capture image data into the image formation apparatus 100 by using an optical sensor. The printing unit (printer engine) 105 is an image output device which is a processing unit configured to print image data within the image formation apparatus 100 on a printing medium and output it.

The controller 101 is a control unit connected to the network 102, operating unit 103, reading unit 104 and printing unit 105 for general control over the image formation apparatus 100. The controller 101 includes a system bus 106, a communication unit I/F 107, a CPU 108, a RAM 109, a ROM 110, an HDD 111, an operating unit I/F 112, a reading unit I/F 113, a drawing processing unit (a rendering processing unit) 114, a block RAM 115, a compression processing unit 116, a decompression processing unit 117, and a printing unit I/F 118.

The system bus 106 is a communication path which connects those components of the controller 101 for exchange of image data and control information between the components. The communication unit I/F 107 is an interface which may be implemented by a LAN card, for example, and may exchange image data and device information with an external apparatus such as a host computer and a server and the image formation apparatus 100 over the network 102.

The CPU 108 is a processing unit configured to generally control the image formation apparatus 100. The CPU 108 particularly in PDL printing processing may interpret PDL data (which is an example of print data) received from an external apparatus over the network 102 and convert them to intermediate data called a DL (display list). The RAM (random access memory) 109 is a volatile memory which is usable as a work area by which the CPU 108 runs on the system and as a buffer area for temporarily storing image data. The ROM (read only memory) 110 is a non-volatile memory which is a temporary storage unit configured to store a program causing the CPU 108 to boot the system. This program is decompressed in the RAM 109 upon startup of the image formation apparatus 100 and is executed by the CPU 108. The HDD (hard disk drive) 111 is a large-capacity storage unit configured to store image data within the image formation apparatus 100.

The operating unit I/F 112 is an interface configured to acquire a user operation as control information for image processing and to display control information for image processing to a user. The reading unit I/F (scan image processing unit) 113 is an image processing unit connected to the reading unit (scanner engine) 104 and configured to perform image processing for a correction based on a device characteristic of the reading unit 104 on image data input from the reading unit 104.

The drawing processing unit 114 performs a drawing process (rendering process) based on vector intermediate data (DL) generated by the CPU 108 from PDL data and outputs raster image data (raster data) to the block RAM 115. The drawing processing unit 114 internally includes a register (called an internal register), and a plurality of drawing processing units (including a first drawing processing unit 401 and a second drawing processing unit 402). The internal register stores information regarding a drawing process. The plurality of drawing processing units are capable of performing drawing processes in parallel. The drawing processing units acquire their identification information (ID) by referring to predetermined addresses different from each other in the internal register upon startup. The block RAM 115 includes a memory configured to temporarily holding raster data and an access detecting device. The block RAM 115 is capable of detecting a write and a read of raster data to and from a specific address in the memory. The compression processing unit 116 is configured to extract raster data (tile data) having a rectangular shape (tile shape), which will be described below, from the raster data temporarily held in the block RAM 115 and performs compression processing on the extracted tile data to generate compressed image data. In other words, the compression processing unit 116 extracts (segments) a hand into blocks of raster data and performs compression processing on the raster data blocks. The compression processing unit 116 is configured to perform compression processing as an example of image processing to be performed on tile data, but the image processing of the present invention is not limited to such compression processing.

The operations to be performed by the drawing processing unit 114, block RAM 115, and compression processing unit 116 associated with drawing processing for PDL printing will be described in detail with reference to FIGS. 4A and 4B.

The decompression processing unit 117 is configured to perform decompression processing on the compressed image data having undergone compression processing in the compression processing unit 116 to generate decompressed image data.

The printing unit I/F (print image processing unit) 118 is connected to the printing unit (printer engine) 105. The printing unit I/F (print image processing unit)118 is configured to perform an image process (such as a gamma correction process) on decompressed image data having undergone the decompression processing for a correction based on a device characteristic of the printing unit 105 and then output the corrected image data to the printing unit 105.

Next, with reference to FIG. 2 and FIGS. 3A and 3B, a dataflow of PDL printing processing in the image formation apparatus 100 and a relationship between image data units will be described. FIG. 2 illustrates a dataflow of PDL printing processing in the image formation apparatus 100. FIGS. 3A and 3B illustrate example coordinate systems of tile data within a page to be handled in the image formation apparatus 100. This page is represented by PDL data. The CPU 108 decompresses a program stored in the HDD 111 into the RAM 109 upon startup of the image formation apparatus 100. When the program is executed, the components illustrated in FIG. 1 are generally controlled to implement the dataflow in FIG. 2.

As illustrated in FIG. 2, the communication unit I/F 107 in the image formation apparatus 100 is configured to receive PDL data from the host computer and store them as PDL data 201 in pages into the RAM 109. Next, the CPU 108 interprets the received PDL data 201, generates intermediate data (DL) 202 in pages and stores them in the RAM 109 again. FIG. 12A illustrates an example of the generated intermediate data (DL) 202 in a page unit. The intermediate data (DL) exemplarily illustrated in FIG. 12A include information (End Of Page) indicative of the end of the data and five drawing objects (rendering objects) 1 to 5. Each of the drawing objects 1 to 5 holds information on a position where it is to be drawn, and the drawing objects 1 to 5 sorted in coordinate position order (increasing order of Y coordinates) in a sub scanning direction are contained in the intermediate data.

After intermediate data are generated, the CPU 108 sets the first address of addresses in the RAM 109 storing the intermediate data as parallel drawing processing setting information (hereinafter, also simply called drawing processing setting information) 203 in the internal register in the drawing processing unit 114. In this case, the CPU 108 also includes the information regarding parallel operations to be performed in the drawing processing unit 114 (such as the number of drawing processing units to be caused to operate in parallel (or the number of parallel operations) and the number of pixels (height) in a sub scanning direction on bands to be drawn by the drawing processing units) in the drawing processing setting information 203.

FIGS. 3A and 3B exemplarily illustrate band units. In other words, the band unit here refers to a strip-like rectangular region having a number of pixels (height) in the sub scanning direction (also called a height direction) smaller than a number of pixels (width) in the main scanning direction (also called a scan line direction or width direction) acquired by dividing a single page in the sub scanning direction. On the other hand, the block unit (also called a tile unit) here refers to a square tile-shaped rectangular region having the number of pixels (width) in a predetermined main scanning direction equal to the number of pixels (height) in the sub scanning direction in the image formation apparatus 100, as illustrated in FIGS. 3A and 3B. In other words, the width of the band unit is equal to the width of the page unit and is equal to or larger than the width of the block unit (or tile).

FIG. 3A and FIG. 3B are different in whether a positional relationship exists that the rectangular region of the block unit is contained in the rectangular region of the band unit. Referring to FIG. 3A, the block units are contained in the band unit, and a single band contains a plurality of blocks. The band units illustrated in FIG. 3B, on the other hand, are suitable for parallel drawing processes. Blocks here are not contained in a band, and one block contains data of at least a plurality of bands. In other words, data pieces of adjacent bands are data of different parts of one block. The number of pixels (height) in the sub scanning direction of each of the bands in FIG. 3B is equal to the number acquired by dividing the number of pixels (height) in the sub scanning direction of the block by the number of parallel operations. More specifically, as illustrated in FIG. 3B, the height of the band 11 or band 12 in a single page 1 is acquired by dividing the height of the single block 11 by the number of parallel operations "2".

According to this exemplary embodiment, as illustrated in FIG. 3B, a band drawn by one drawing processing unit corresponds to one resulting from fine division of a page in the sub scanning direction. This reason will be described. A page is divided into a plurality of regions for parallel drawing processes. Dividing a single drawing object into a plurality of different rectangular regions may generally increase an overhead of a drawing process though it also depends on the complexity of a drawing object such as a character, a photograph and a figure included in a page. In order to reduce such an overhead of a drawing process, this exemplary embodiment considers a characteristic of a drawing processing algorithm. Assume that the drawing processing algorithm to be applied by a drawing processing unit according to this exemplary embodiment is a scan line method (which sequentially draws pixels along a scan line), for example. In this case, segmenting a page in the sub scanning direction can minimize the overhead of a drawing process rather than dividing a page in a main scanning direction. In other words, in a case where a plurality of drawing processing units which perform drawing processes in accordance with the scan line method are used for parallel drawing processes, the parallel drawing processes may effectively be performed on bands.

The following exemplary embodiment will be described in bands and blocks within the page defined in FIG. 3B.

The drawing processing unit (raster image processor or RIP) 114 refers the intermediate data (DL) 202 stored in the RAM 109 and executes drawing processes in parallel on rectangular regions which are a plurality of bands within a single page. The drawing processing unit 114 generates raster image data (raster data) 204 of the plurality of bands by performing the parallel drawing processes and temporarily holds the raster data in the block RAM 115.

Next, the compression processing unit 116 bonds the raster data of the plurality of bands, which are temporarily held in the block RAM 115, and reads out raster data of blocks from the raster data of the bonded plurality of bands. The raster data of a single block includes raster data of a plurality of bands. The compression processing unit 116 performs JPEG compression processing on the read raster data of blocks to generate compressed image data and stores the compressed image data again in the RAM 109.

Furthermore, the decompression processing unit 117 performs JPEG decompression processing on the compressed image data of all blocks included in the single page, which are stored in the RAM 109, to generate raster data of the page and temporarily stores them in the RAM 109 again.

After that, the printing unit I/F 118 reads out the raster data of the page temporarily held in the RAM 109 and performs an image process for a correction based on a device characteristic of the printing unit 105. Then, the printing unit I/F 118 outputs the corrected image data to the printing unit 105. In response to it, the printing unit (printer engine) 105 performs printing based on the image data transferred from the printing unit I/F 118.

Next, with reference to FIGS. 4A and 4B, operations in drawing processing for PDL printing according to this exemplary embodiment will be described. FIGS. 4A and 4B illustrate internal operations including executing drawing processes in parallel on bands of the intermediate data (DL) 202 temporarily held in the RAM 109 and then storing the compressed image data 205 in blocks in the RAM 109 again.

FIG. 4A illustrates an example in a case where rectangular regions of blocks are included in rectangular regions of a band, as illustrated in FIG. 3A. Referring to FIG. 4A, the image formation apparatus 100 uses the first drawing processing unit 401 and second drawing processing unit 402 included in the drawing processing unit 114 to draw a plurality of bands within a single page in parallel. For example, the first drawing processing unit 401 may perform a drawing process on odd-numbered bands within the single page and update coordinates of each scan line of a contour of a drawing object, without performing a drawing process on even-numbered bands. For example, the second drawing processing unit 402 may perform a drawing process on even-numbered bands within the single page and only update coordinates of each scan line of the contour of the drawing object, without performing a drawing process on odd-numbered bands.

In this way, the first drawing processing unit 401 and second drawing processing unit 402 acquire drawing objects to be drawn in bands. According to this exemplary embodiment, the intermediate data (DL) 202 temporarily stored in the RAM 109 are handled in pages. However, the intermediate data (DL) may be divided into bands in advance for easy acquisition of drawing objects in bands.

Next, the first drawing processing unit 401 sequentially outputs image data of a band 1 and a band 3 illustrated in FIG. 3A to a first block RAM 411 included in the block RAM 115. On the other hand, the second drawing processing unit 402 sequentially outputs image data of a band 2 and a band 4 illustrated in FIG. 3B to a second block RAM 412 included in the RAM 115.

Next, a first compression processing unit 421 included in the compression processing unit 116 sequentially reads out the image data in blocks from the band 1 illustrated in FIG. 3A, which are temporarily stored in the first block RAM 411, executes compression processing thereon and transfers the result to the RAM 109. On the other hand, the second compression processing unit 422 included in the compression processing unit 116 sequentially reads out image data in blocks from the band 2 illustrated in FIG. 3A, which are temporarily stored in the second block RAM 412, executes compression processing thereon and transfers the result to the RAM 109.

Here, the first block RAM 411 includes a double buffer from and to which a write to be performed by the first drawing processing unit 401 and a read to be performed by the compression processing unit 116 are executable simultaneously. This allows simultaneous execution of the write processing on the band 3 performed by the first drawing processing unit 401 and the read processing on the blocks 11 to 14 within the band 1 performed by the first compression processing unit 421, for example. The second block RAM 412 is configured as described above.

As described above, it could be understood from the example in FIG. 4A that not only the resources are required for the parallel processing in the drawing processing unit 114, but also a plurality of resources may be required in the block RAM 115 and compression processing unit 116 in accordance with the number of parallel operations in the drawing processing unit 114. In other words, the first block RAM 411, second block RAM 412, first compression processing unit 421, and second compression processing unit 422 may be required.

FIG. 4B illustrates an example in a case where the number of pixels in the sub scanning direction of blocks are divided by the height of a plurality of bands based on the number of parallel operations in the drawing processing unit 114, as illustrated in FIG. 3B, without inclusion of rectangular regions of blocks in a rectangular region of a band unit. Referring to FIG. 4B, the image formation apparatus 100 draws a plurality of bands within a single page in parallel by using the first drawing processing unit 401 and second drawing processing unit 402 included in the drawing processing unit 114. In other words, the number of parallel operations in the drawing processing setting information 203 is "2". The first drawing processing unit 401 performs a drawing process on odd-numbered bands within the single page and updates coordinates of each scan line of a drawing object, without performing a drawing process on even-numbered bands. The second drawing processing unit 402 performs a drawing process on even-numbered bands within the single page and updates coordinates of each scan line of the drawing object, without performing a drawing process on the odd-numbered bands.

Thus, each of the first drawing processing unit 401 and second drawing processing unit 402 acquires a drawing object to be drawn in bands. According to this exemplary embodiment, the intermediate data (DL) 202 temporarily stored in the RAM 109 are handled in pages. However, the intermediate data (DL) may be divided into bands in advance for easy acquisition of drawing objects in bands.

Next, the first drawing processing unit 401 sequentially outputs image data of a band 11 and a band 21 illustrated in FIG. 3B to the first block RAM 411 included in the block RAM 115. On the other hand, the second drawing processing unit 402 sequentially outputs image data of a band 12 and a band 22 illustrated in FIG. 3B to the first block RAM 411 included in the RAM 115.

Next, the first compression processing unit 421 in the compression processing unit 116 sequentially reads out the image data in blocks from the band bonding the band 11 and band 12 illustrated in FIG. 3B temporarily stored in the first block RAM 411. The first compression processing unit 421 executes compression processing on the read image data in blocks and then transfers the compressed image data to the RAM 109.

Also in this case, each of the first block RAM 411 and second block RAM 412 includes a double buffer from and to which writes to be performed by the drawing processing units 401, 402 and a read to be performed by the compression processing unit 116 are executable simultaneously.

As described above, it is understood from the example in FIG. 4B that only the resource for the parallel processes in the drawing processing unit 114 may be required for the parallel processes in the drawing processing unit 114 without any change in resources in the block RAM 115 and compression processing unit 116.

FIG. 5 illustrates an example in which the first drawing processing unit 401 is only operated by stopping the second drawing processing unit 402 in FIG. 4B. In this case, because the number of parallel operations in the drawing processing unit 114 is equal to 1, the positional relationship in which rectangular regions of blocks are included in a rectangular region of a band is satisfied as in the FIG. 3A.

Referring to FIG. 5, the image formation apparatus 100 may only use the first drawing processing unit 401 included in the drawing processing unit 114 to sequentially draw bands within a single page. In other words, the number of parallel operations in the drawing processing setting information 203 is "1". Next, the first drawing processing unit 401 sequentially outputs image data of the band 1 and band 2 illustrated in FIG. 3A to the first block RAM 411 included in the block RAM 115. Next, the first compression processing unit 421 included in the compression processing unit 116 sequentially reads the image data in blocks from the band corresponding to the band 1 illustrated in FIG. 3A temporarily stored in the first block RAM 411, executes compression processing thereon and transfers them to the RAM 109. Also in this case, the first block RAM 411 includes a double buffer from and to which a write to be performed by the drawing processing unit 401 and a read to be performed by the compression processing unit 116 are executable simultaneously.

As described above, referring to the example in FIG. 5, even when the drawing processing setting for the drawing processing unit 114 is changed to stop a part of a plurality of drawing processing units, the same drawing processing may be implemented by changing the number of parallel operations in the drawing processing and the heights of bands in association.

FIG. 6 is a flowchart illustrating PDL printing processing. This flowchart is implemented by the CPU 108 by executing a program stored in the ROM 110 for general control over the components illustrated in FIG. 1.

First of all, the CPU 108 receives PDL data transmitted from a host computer through the communication unit I/F 107 and stores them as PDL data 201 in pages in the RAM 109 (S601) (hereinafter "S" stands for Step).

Next, the CPU 108 interprets the received PDL data 201 (S602) and generates intermediate data (DL) 202 based on the interpreted information (S603). The intermediate data (DL) is exemplarily illustrated in 12A.

Next, the CPU 108 defines a parallel drawing processing setting for the drawing processing unit 114 (S604). More specifically, the setting of the height of a band to be drawn by the drawing processing unit 114 is defined. S604 will be described in detail with reference to a flowchart in FIG. 7.

Next, the CPU 108 controls the drawing processing unit 114 so as to execute drawing processing and thus generate raster image data (raster data) 204 (S605). S605 will be described in detail with reference to the flowchart in FIG. 9.

Next, the CPU 108 controls the compression processing unit 116 so as to execute compression processing thereon and then store the compressed image data 205 in the RAM 109 (S606). S606 will be described in detail with reference to FIGS. 10A to 10E.

Next, the CPU 108 controls the decompression processing unit 117 so as to execute decompression processing on the compressed image data 205 stored in the RAM 109 and then store the image data 206 in the RAM 109 again (S607).

Next, the CPU 108 controls the printing unit I/F 118 so as to transfer the image data 206 from the RAM 109 to the printing unit 105 Then, the CPU 108 performs a correction image process based on a device characteristic of the printing unit 105 on the image data 206 and then transfers the processed image data to the printing unit 105 (S608).

After that, the printing unit 105 prints and outputs the image data transferred from the printing unit I/F 118 to a printing medium (S609).

FIG. 7 is a flowchart illustrating a setting for a drawing process in S604.

First, the CPU 108 acquires the height of a block which is an image data unit to be handled within the image formation apparatus 100 from the ROM 110 (S701). The block height is predetermined according to this exemplary embodiment but may be determined dynamically in accordance with the operation mode, which is set by a user, of an image formation apparatus. For easy description, a block unit is assumed as an 8 pixels×8 pixels square tile.

Next, the CPU 108 acquires from the register within the drawing processing unit 114 the number of parallel operations in the resources for performing drawing processes in bands in the drawing processing unit 114 (S702). For the number of parallel operations, different values according to the operation mode of the image formation apparatus set by a user are set in the internal register by the CPU 108 before the processing in S702. For example, in a case where a user designates a power-saving printing mode as the operation mode, the number of parallel operations in the drawing processing unit 114 is set as "1" in the internal register as illustrated in FIG. 5. In a case where a user does not designate the power-saving printing mode as the operation mode, for example, the number of parallel operations in the drawing processing unit 114 is set as "2" in the internal register as illustrated in 4B, For example, in a case where a user designates a high-speed printing mode as the operation mode, the number of parallel operations in the drawing processing unit 114 is set as "4" (or 2 or higher) in the internal register.

Next, the CPU 108 judges whether the number of parallel operations acquired in S702 is equal to or higher than 2 or not (S703). If it is determined in S703 that the number is equal to or higher than 2 (YES), the processing moves to S705. If the number is 1 in S703 (NO), the processing moves to S704.

In S704, the CPU 108 sets the block height acquired in S701 in the drawing processing setting information 203 in the internal register as the height of a band which is a processing unit in the drawing processing unit 114. For example, because the number of parallel operations is 1 for the 8 pixels×8 pixels block unit, the band height is set as 8 pixels in the internal register of the drawing processing unit 114.

On the other hand, in S705, the CPU 108 sets the band height dividing the block height acquired in S701 by the number of parallel operations acquired in S702 in the drawing processing setting information 203 in the internal register (S706). For example, because the number of parallel operations is 2 for the 8 pixels×8 pixels block unit, the band height is set as 4 pixels in the internal register of the drawing processing unit 114.

The processing flow for defining the drawing processing setting has been described above.

FIG. 9 is a flowchart illustrating a parallel drawing process. Assume that the drawing processing unit 114 operates under control of the CPU 108.

First, a read processing unit (see FIG. 4B and FIG. 5) in each of the drawing processing units operating in the drawing processing unit 114 acquires the first address in the intermediate data (DL) set by the CPU 108 as the drawing processing setting information 203 in the internal register of the drawing processing unit 114 (S901).

Next, the drawing processing unit 114 acquires the band height set by the CPU 108 in S604 from the internal register (S902).

Next, each of the drawing processing units in the drawing processing unit 114 acquires the number of parallel operations for executing drawing processing in bands within the drawing processing unit 114 and its ID from the internal register (S903). For example, the first drawing processing unit 401 in the drawing processing unit 114 illustrated in FIG. 4B may acquire "2" as the number of parallel operations and "1" as its ID. The second drawing processing unit 402 may acquire "2" as the number of parallel operations and "2" as its ID.

The processing from S904 to S909 is repeated on each of bands from the first band to the last band included in the intermediate data (DL). A band that is the current processing target is referred to as the band.

Each of the drawing processing units in the drawing processing unit 114 acquires a drawing object included in the band region from the intermediate data (DL) (S904). According to this exemplary embodiment, each of the drawing processing units 401 and 402 acquires a drawing object by sequentially accessing the intermediate data (DL) in pages from the first address to the last address acquired in S901. FIG. 12A illustrates an outline of the intermediate data (DL) according to this exemplary embodiment. In other words, the intermediate data (DL) 202 in each page are generated by the CPU 108 in which drawing objects each having information (X coordinate and Y coordinate) on a position where it is to be drawn are stored in order from the first band to the last band. Thus, by checking the coordinate (Y coordinate) of the drawing object from the beginning of the intermediate data (DL), a drawing object included within the range of the X coordinate and Y coordinate of the band may be easily acquired.

Next, each of the drawing processing units in the drawing processing unit 114 judges whether the band corresponds to the ID acquired in S903 (S905). For example, the judgment may include judging whether the value of a remainder acquired by dividing the place of the band from the first band by the number of parallel operations is matched with the ID number or not. The judgment method is not limited thereto, and the judgment is essentially required to judge whether the drawing processing unit performs the drawing processing on the band by itself or not.

For example, the first drawing processing unit 401 illustrated in FIG. 4B judges that the band 11 (the first band in the order illustrated in FIG. 3B) is a drawing target because the ID of the first drawing processing unit 401 is 1. On the other hand, the second drawing processing unit 402 illustrated FIG. 4B judges that the band 11 illustrated in FIG. 3B is not a drawing target because the ID of the second drawing processing unit 402 is 2.

For example, the first drawing processing unit 401 illustrated in FIG. 4B judges that the band 12 (second band in the order illustrated in FIG. 3B) is not a drawing target because the ID of the first drawing processing unit 401 is 1. On the other hand, the second drawing processing unit 402 illustrated in FIG. 4B judges that the band 12 illustrated in FIG. 3B is a drawing target because the ID of the second drawing processing unit 402 is 2.

If it is judged as a drawing target in S905 (YES), the processing moves to S906. If not in S905 (NO), the processing moves to S908.

Next, in S906, each of the drawing processing units in the drawing processing unit 114 judges whether the block RAM 115 has any empty region available or not. This judgment on whether any empty region is available or not is performed based on a notification from the block RAM 115. If not (NO), the drawing processing unit awaits until an empty region becomes available in S906. If so (YES), the processing moves to S907. The judgment on whether any empty region is available or not (or the relationship between a read of raster data performed by the compression processing unit 116 from the block RAM 115 and a write of raster data by the drawing processing units to the block RAM 115) will be described below with reference to FIGS. 10A to 10E.

In S907, each of the drawing processing units in the drawing processing unit 114 acquires from information on the display list the coordinate (X coordinate) of the intersection between the contour of a drawing object included in the band region and the current scan line (Y coordinate). The drawing processing unit draws the current scan line including the drawing object based on the acquired positional information. The drawing is implemented by repetitively generating raster data and outputting (writing) the generated raster data to the empty region in the block RAM 115. The drawing processing unit acquires the coordinate (X coordinate) of the contour of the drawing object on the next scan line and performs drawing on the scan line in the manner described above. The relationship between a write of raster data by each of the drawing processing units to the block RAM 115 and a read of raster data by the compression processing unit 116 from the block RAM 115 will be described below with reference to FIGS. 10A to 10E.

The coordinates of the contour of a drawing object on the next scan line may be acquired based on positional information of the contour of the drawing object acquired on the current scan line and the gradient of the contour (the moving amount of the X coordinate for each advance of the scan line (Y coordinate)).

In S908 on the other hand, each of the drawing processing units in the drawing processing unit 114 acquired from the information on the display list the coordinate (X coordinate) of the intersection between the contour of a drawing object included in the band region and a scan line (Y coordinate). The positional information of the contour of the drawing object on the next scan line is acquired from the positional information of the contour of the drawing object on the immediately preceding scan line and the gradient of the contour (the moving amount of the X coordinate for each advance of the scan line (Y coordinate)). The drawing processing unit sequentially updates the coordinate of the contour of a drawing object with the newly acquired coordinate for each scan line. Because the band in this case is not a drawing target to the drawing processing unit, the drawing processing unit does not perform drawing processing (or does not generate raster data).

The update by acquiring the coordinate of a drawing object in a band which is not a drawing target is for drawing the drawing object at a correct position even in a case where the drawing object is included in the next band which is a drawing target. This is exemplarity illustrated in FIGS. 12A and 12B. First, the second drawing processing unit 402 adds a gradient ls4 of the left side of a triangular drawing object 4 described in the intermediate data (DL) 202 to the coordinate of the contour of the drawing object every time the scan line advances. Thus, the correct position of the left side of the drawing object 4 can be acquired. Next, the second drawing processing unit 402 acquires the X coordinate of the contour of the drawing object 4 on a final scan line of the band 31 which is not a drawing target so that the correct position of the contour of the drawing object 4 can be acquired for drawing the first scan line of a band 32.

In S909, each of the drawing processing units in the drawing processing unit 114 judges whether the intermediate data (DL) stored in the RAM 109 contains the next band that is a drawing target or not. If so (YES), the drawing processing is repeated. If not (NO), the drawing processing ends. It is determined that no next band exists if the intermediate data (DL) has been read to the end (End Of Page). If the intermediate data (DL) has not been read to the end, it is judged that the next band exists.

FIGS. 10A to 10E illustrate access control over writes in bands and reads in blocks. FIG. 10A illustrates image data to be written in bands in parallel to the memory (hereinafter, called the first block RAM 411) included in the block RAM 115. FIG. 10B illustrates image data to be read in blocks from the block RAM 115.

As illustrated in FIG. 10A, the raster data of the band 11 are written to the first block RAM 411 by the first drawing processing unit 401 in the drawing processing unit 114. The raster data of the band 12 is written to the first block RAM 411 by the second drawing processing unit 402 in the drawing processing unit 114. Here, the block RAM 115 detects that raster data have been written to all of a plurality of addresses (pixel positions) indicated by "WRITE ACCESS DETECTED" in FIG. 10A by an access detecting device. Particularly, the block RAM 115 detects that raster data have been written to the addresses 1011 and 1012 in the first block RAM 411. Because, according to this exemplary embodiment, raster data are written to the first block RAM 411 in the order of pixels of a scan line, the completion of drawing of each band could be judged by detecting a write to the last address to which raster data of each band are to be written.

If writes of raster data to all of the addresses are detected, the block RAM 115 notifies the compression processing unit 116 of information notifying that reading in blocks is ready. The compression processing unit 116 (first compression processing unit 421) in response to the notification starts reading raster data in blocks (such as 8 pixels×8 pixels each) from the first block RAM 411. In other words, the compression processing unit 116 reads raster data in order from a block 11 to a block 14 as illustrated in FIG. 10B. In response to the reads, the block RAM 115 detects that raster data have been read from a plurality of addresses (pixel positions) 1011 and 1012 indicated as "READ ACCESS DETECTED" in FIG. 10B by the access detecting device. This is because the reading of raster data from the addresses 1011 and 1012 in the first block RAM 411 means that reading all raster data of each band divided into blocks. In other words, this is because it could be judged that an empty region is available in the first block RAM 411.

When the reading of raster data from both of the addresses 1011 and 1012 is detected, the block RAM 115 notifies each of the drawing processing units in the drawing processing unit 114 of the information describing that an empty region is available in the block RAM 115. Based on the notification, the judgment in S906 is performed. In other words, in response to the notification, each of the drawing processing units in the drawing processing unit 114 starts writing in bands, as illustrated in FIG. 10A.

As described above, according to this exemplary embodiment, the speed of drawing processing could be increased only with a minimum extension of hardware resources for parallel drawing processes and without increasing the costs. In other words, without extensions of the hardware resources of the first block RAM 411 included in the block RAM 115 and the first compression processing unit 421 included in the compression processing unit 116, the parallel operations of the first drawing processing unit 401 and second drawing processing unit 402 included in the drawing processing unit 114 are allowed.

First Variation Example

FIG. 8 is a flowchart illustrating a setting for a drawing process according to a variation example of this exemplary embodiment. Because FIG. 8 is a variation example of the flowchart illustrated in FIG. 7, differences from the flowchart in FIG. 7 will be described, and the description of the common parts to those in FIG. 7 will be omitted. Because the processing in S801 to S804 in FIG. 8 is the same as the processing in S701 to S704, the description will be omitted.

Next, the CPU 108 in S805 acquires from the internal register information describing a performance specification difference (difference in drawing processing capability) between drawing processing units operating in parallel in the drawing processing unit 114. This information is prestored in the internal register by the CPU 108. Here, the term "performance specification difference" refers to the ratio of the operating frequency of the second drawing processing unit 402 to that of the first drawing processing unit 401, for example. The term "performance specification difference" further refers to the ratio of the number of processor cores or the number of hardware module cores included in the second drawing processing unit 402 to that of the first drawing processing unit 401, for example.

Next, the CPU 108 in S806 judges the presence/absence of a performance specification difference based on the performance specification difference ratio acquired in S805.

Here, if the performance specification difference ratio is 1:1 and it is judged that there is no performance specification difference (NO in S806), the processing moves to S807, and the processing in S807 to S808 is executed in the same manner as that in S705 to S706 in FIG. 7.

On the other hand, if the performance specification difference ratio is 3:1, for example, and it is judged that there is a performance specification difference (that is, the drawing processing capability of the first drawing processing unit 401 is three times of the drawing processing capability of the second drawing processing unit 402) (YES in S807), the processing moves to S809.

The CPU 108 in S809 weights and segments the height of a single block based on the information describing a performance specification difference between drawing processing units operating in parallel. In other words, for example, as described above, if the performance specification difference ratio is 3:1, for example, and it is judged that there is a performance specification difference, the height of a single block is weighted and is segmented in accordance with the performance specification difference ratio, like the band 11 and band 12 in FIG. 10C. In other words, the CPU 108 determines a higher band height to be set for a drawing processing unit having a higher drawing processing capability. For example, in a case where the height of a single block is equal to 8 pixels, the CPU 108 may set, for the segmentation, a height equal to 6 pixels as the height of a drawing region for the first drawing processing unit 401 and a height equal to 2 pixels as the height of a drawing region for the second drawing processing unit 402.

As described above, according to this variation example, drawing regions may be segmented so as to minimize a difference in drawing speed between a plurality of drawing processing units operating in parallel in the drawing processing unit 114 in view of the performance differences therebetween for higher efficiency of the parallel operations. In other words, in a case where drawing processes in bands are performed in parallel, a waiting time due to the rate limiting based on a slower one of the first drawing processing unit 401 and second drawing processing unit 402 could be reduced.

Second Variation Example

In order to equally segment the height of the single block illustrated in FIG. 10A by the number of parallel operations, an integral multiply of the number of parallel operations may be applied as illustrated in FIG. 10D or FIG. 10E. In other words, because a smaller band height can be achieved, a smaller band unit can be achieved. For example, in the case illustrated in FIG. 10D, the height is equally segmented by 4 which is equal to two times of 2 that is the number of parallel operations of drawing processing units for drawing an 8 pixels×8 pixels block unit. In this case, it is controlled such that the first drawing processing unit 401 may draw the band 11 and band 13 and the second drawing processing unit 402 may draw the band 12 and band 14. Alternatively, for example, in the case in FIG. 10E, the height is equally segmented by 8 which is equal to four times of 2 that is the number of parallel operations of drawing processing units for drawing an 8 pixels×8 pixels block unit. In this case, it is controlled such that the first drawing processing unit 401 may draw the band 11, band 13, band 15, and band 17 and the second drawing processing unit 402 may draw the band 12, band 14, hand 16, and band 18. In other words, a plurality of drawing processing units generate raster data of bands repetitively (alternately) in the order along the height direction.

As described above, according to this variation example, segmenting a drawing region so as to minimize the difference in amount of computation between a plurality of drawing processing units operating in parallel in the drawing processing unit 114 for higher efficiency of the parallel operations. In other words, in a case where drawing processes in bands are executed in parallel, the reduced height of the bands could alleviate the variations of the number objects included in each of the bands. This may achieve a uniform amount of computation involved in the drawing processes performed by the first drawing processing unit 401 and the second drawing processing unit 402, and the waiting time due to the rate-limiting based on a slower one of the first drawing processing unit 401 and second drawing processing unit 402 could be reduced.

Third Variation Example

FIGS. 11A to 11E illustrate examples of a relationship between blocks and bands within a page defined according to a third variation example of the exemplary embodiment. As described above, a block refers to a unit rectangular region which is a segment of image data in a page unit within the image formation apparatus and which has a 32 pixels×32 pixels square tile shape, for example. On the other hand, a band refers to a rectangular region having a higher number of pixels in a main scanning direction and a lower number of pixels in a sub scanning direction than those of a block, for example, as illustrated in FIGS. 11B and 11D. Here, the relationship illustrated in FIG. 11A is a positional relationship in which blocks are included in a band. According to this variation example, the relationships in FIGS. 11A, 11B, and 11D may be changed in accordance with the drawing processing setting for the image formation apparatus. The width of all of bands illustrated in FIGS. 11A, 11B and 11D is equal to the width of a page corresponding to print data.

According to the present invention, the bandwidth of a band to be drawn is not limited to the width of the page, and the bandwidth may be smaller than the page width. In other words, as illustrated in FIGS. 11C and 11E, such a band unit may be segmented in the main scanning direction. In this case, a plurality of left bands, illustrated in FIGS. 11C and 11E, of the bands divided in the main scanning direction may be drawn in the block RAM 115, and the block segmentation may be performed on the raster data of the plurality of left bands by the compression processing unit 116. After the block segmentation completes, a plurality of right bands may be drawn in the block RAM 115, and the block segmentation may be performed in the same manner. In this way, segmenting a band unit to be drawn in the main scanning direction may further reduce the memory capacity required in the block RAM 115.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-199178, filed Sep. 29, 2014, which is hereby incorporated by reference herein in its entirety.

The invention claimed is:

1. An image processing apparatus which segments a raster image having a predetermined width and a predetermined height, the apparatus comprising:
an acquiring unit configured to acquire print data;
a plurality of rendering units configured to generate a raster image having the predetermined width and the predetermined height, wherein each rendering unit is configured to perform rendering to generate respective raster images each having the predetermined width and a height smaller than the predetermined height based on the print data, the rendering being performed in parallel by the plurality of rendering units; and
a segmenting unit configured to segment the generated raster image having the predetermined width and the predetermined height into raster images of a plurality of segments each having a width smaller than the predetermined width and the predetermined height.

2. The image processing apparatus according to claim 1, wherein the height smaller than the predetermined height is determined based on the predetermined height and the number of the plurality of rendering units.

3. The image processing apparatus according to claim 1, wherein the height smaller than the predetermined height is a height acquired by dividing the predetermined height by the number of the plurality of rendering units.

4. The image processing apparatus according to claim 1, wherein the height smaller than the predetermined height is determined based on the capability of rendering of at least one rendering unit of the plurality of rendering units.

5. The image processing apparatus according to claim 1, wherein each of the plurality of rendering units repetitively generates rectangular raster data in order along a height direction.

6. The image processing apparatus according to claim 1, wherein the predetermined width is equal to the width of a page corresponding to the print data.

7. The image processing apparatus according to claim 1, wherein the predetermined width is smaller than the width of a page corresponding to the print data.

8. The image processing apparatus according to claim 1, further comprising a detecting unit configured to detect generation by the plurality of rendering units of the raster image having the predetermined width and the predetermined height and notify the completion of the generation of the raster image to the segmenting unit,
wherein the segmenting unit starts the segmentation based on the notification of the completion of the generation.

9. The image processing apparatus according to claim 8, wherein when the detecting unit detects the completion of the segmentation performed by the segmenting unit, the detecting unit notifies the completion of the segmentation to each of the plurality of rendering units; and
in response to the notification of the completion of the segmentation, the plurality of rendering units perform, in parallel, rendering to generate respective raster image having the predetermined width and a height smaller than the predetermined height based on the print data.

10. The image processing apparatus according to claim 1, wherein the number of the plurality of rendering units is equal to two.

11. The image processing apparatus according to claim 1, wherein the plurality of rendering units generate on a storage unit a raster image having the predetermined width and the predetermined height; and
the segmenting unit reads the raster image generated on the storage unit in the segments and performs the segmentation thereon.

12. The image processing apparatus according to claim 1, wherein the segmenting unit performs compression processing on the raster image of each of the plurality of segments and stores the compressed raster image of the plurality of segments to the storage unit.

13. The image processing apparatus according to claim 1, the apparatus further comprising:
an image processing unit configured to decompress and perform image processing on the stored and compressed raster images of the plurality of segments after raster images, which are compressed by the segmenting unit, of the plurality of segments of one page are stored in the storage unit; and
a printing unit configured to perform printing based on the plurality of raster images of the segments of the one page having undergone the image processing.

14. An image processing method for segmenting a raster image having a predetermined width and a predetermined height, the method comprising:
acquiring print data;
performing rendering in parallel to generate respective raster images each having the predetermined width and a height smaller than the predetermined height based on the print data and generating a raster image having the predetermined width and the predetermined height; and
segmenting the generated raster image having the predetermined width and the predetermined height into raster images of a plurality of segments each having a width smaller than the predetermined width and the predetermined height.

15. A non-transitory computer readable medium storing a program which causes a computer to execute an image processing method for segmenting a raster image having a predetermined width and a predetermined height, the method comprising:
acquiring print data,
performing rendering in parallel to generate respective raster images each having the predetermined width and a height smaller than the predetermined height based on the print data and generating a raster image having the predetermined width and the predetermined height; and
segmenting the generated raster image having the predetermined width and the predetermined height into raster images of a plurality of segments each having a width smaller than the predetermined width and the predetermined height.

* * * * *